United States Patent
Neves Creto et al.

(10) Patent No.: US 11,983,311 B2
(45) Date of Patent: May 14, 2024

(54) CONTENT PROTECTION FOR A GLASSES DEVICE

(71) Applicant: Motorola Mobility LLC, Chicago, IL (US)

(72) Inventors: Alexandre Neves Creto, São Paulo (BR); Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 262 days.

(21) Appl. No.: 17/487,956

(22) Filed: Sep. 28, 2021

(65) Prior Publication Data

US 2023/0094048 A1 Mar. 30, 2023

(51) Int. Cl.
| | |
|---|---|
| *G06F 3/01* | (2006.01) |
| *G02B 27/01* | (2006.01) |
| *G06F 3/0482* | (2013.01) |
| *G06V 20/52* | (2022.01) |
| *G06V 40/18* | (2022.01) |
| *G08B 5/22* | (2006.01) |

(52) U.S. Cl.
CPC ......... *G06F 3/013* (2013.01); *G02B 27/0172* (2013.01); *G06F 3/0482* (2013.01); *G06V 20/52* (2022.01); *G06V 40/193* (2022.01); *G08B 5/22* (2013.01); *G02B 2027/0138* (2013.01); *G02B 2027/0141* (2013.01)

(58) Field of Classification Search
CPC ........ G06F 3/013; G06F 3/0482; G06F 3/012; G06F 21/84; G06F 3/011; G02B 27/0172; G02B 2027/0138; G02B 2027/0141; G02B 2027/014; G06V 20/52; G06V 40/193; G06V 20/20; G06V 40/18; G08B 5/22

See application file for complete search history.

(56) References Cited

U.S. PATENT DOCUMENTS

| 10,893,043 B1 * | 1/2021 | John ..................... H04L 63/083 |
| 10,909,225 B2 | 2/2021 | Agrawal et al. |
| 11,042,649 B1 * | 6/2021 | John .................... G06V 40/171 |
| 2007/0150827 A1 | 6/2007 | Singh et al. |
| 2015/0169953 A1 * | 6/2015 | Border ..................... H04N 5/33 |
| | | 348/78 |

OTHER PUBLICATIONS

"ThinkReality A3 Glasses", Lenovo [online][retrieved Sep. 8, 2021]. Retrieved from the Internet <https://www.lenovo.com/us/en/thinkrealitya3/>., Jan. 11, 2021, 6 Pages.
GB2214158.4, "Combined Search and Examination Report", GB Application No. GB2214158.4, dated Mar. 21, 2023, 6 pages.

* cited by examiner

*Primary Examiner* — David D Davis
(74) *Attorney, Agent, or Firm* — FIG. 1 Patents

(57) ABSTRACT

Techniques for content protection for a glasses device are described and may be implemented to enable sensitive content on a glasses device to be protected from exposure to persons other than a user of the glasses device. Generally, the described implementations utilizing sensor data such as visual data from a camera to detect human gaze to determine whether a person other than a user of a glasses device is positioned to view sensitive content displayed by the glasses device. If a secondary person other than a user of a glasses device is detected as being positioned to view sensitive content, a protection process is implemented to mitigate exposure of the sensitive content to the secondary person.

20 Claims, 10 Drawing Sheets

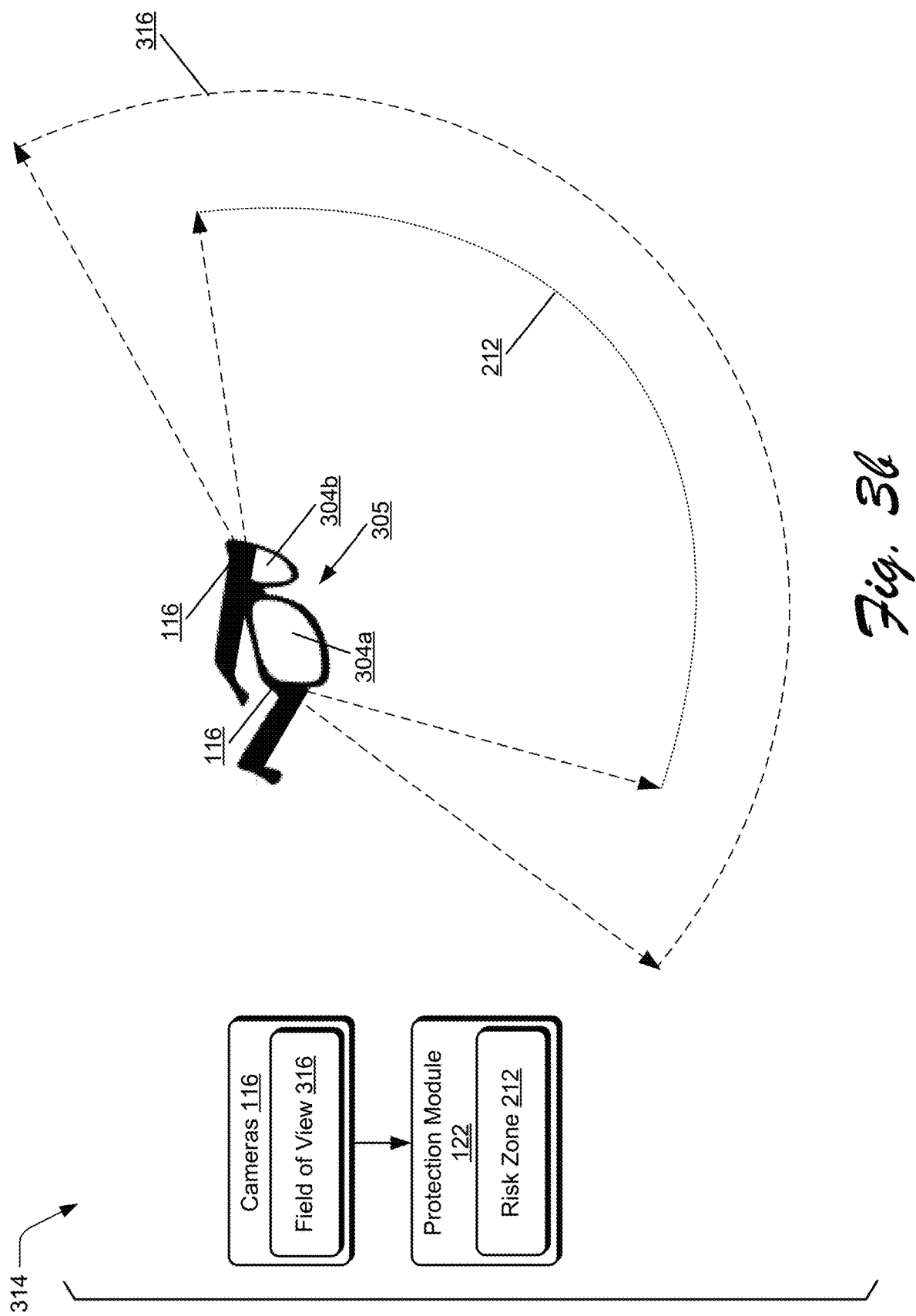

CONTENT PROTECTION FOR A GLASSES DEVICE

BACKGROUND

Today's person is afforded a tremendous selection of devices that are capable of performing a multitude of tasks. For instance, desktop and laptop computers provide computing power and screen space for productivity and entertainment tasks. Further, smartphones and tablets provide computing power and communication capabilities in highly portable form factors. One particularly intriguing device form factor is smart glasses which provide computing functionality in the form of wearable glasses. For instance, augmented reality (AR) glasses provide an interactive experience in which real-world objects are viewable along with computer-generated content presented by the AR glasses.

Some current implementations of AR glasses, however, present security risks for sensitive content displayed by the AR glasses. For instance, content displayed to a wearer of the AR glasses can be reflected on an outer surface of lenses of the AR glasses such that another person in proximity to the AR glasses may view a reflection of the content. When sensitive content (e.g., security-sensitive content) is displayed by the AR glasses this risks unwanted exposure of the sensitive content to secondary persons in proximity to the AR glasses.

BRIEF DESCRIPTION OF THE DRAWINGS

Aspects of content protection for a glasses device are described with reference to the following Figures. The same numbers may be used throughout to reference similar features and components that are shown in the Figures. Further, identical numbers followed by different letters reference different instances of features and components described herein.

FIG. 3b depicts a scenario for defining a risk zone in accordance with one or more implementations;

DETAILED DESCRIPTION

Figure 1:
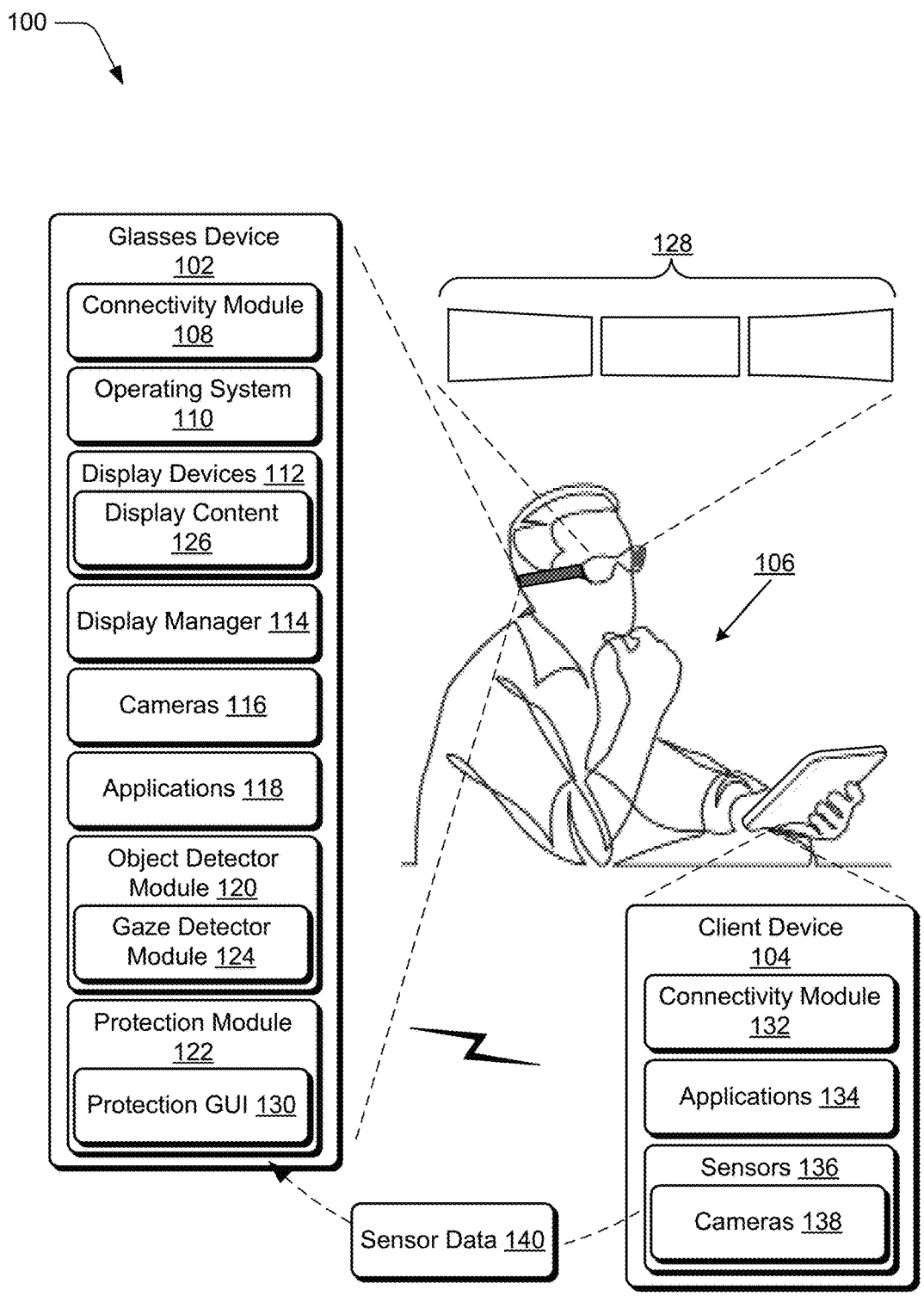
FIG. 1 illustrates an example environment in which aspects of content protection for a glasses device can be implemented.

Techniques for content protection for a glasses device are described and may be implemented to enable sensitive content on a glasses device to be protected from exposure to persons other than a user of the glasses device. A glasses device, for instance, represents a computing device in a glasses form factor, such as augmented reality (AR) glasses, virtual reality (VR) glasses, smart glasses, and so forth. Generally, the described implementations utilize sensor data such as visual data from a camera to detect human presence and human gaze to determine whether a person other than a user of a glasses device (a "secondary person") is positioned to view sensitive content displayed by the glasses device. If a secondary person is detected as being positioned to view sensitive content, a protection process is implemented to protect the sensitive content from being viewed by the secondary person. This provides for greater content security than is provided by conventional implementations of a glasses device.

For instance, consider a scenario in which a user (e.g., a wearer) of a glasses device executes a process that presents sensitive content, such as an application presented by the glasses device. Generally, sensitive content refers to content that a user does not want exposed to a secondary person, such as personally identifiable information (PII), authentication information (e.g., a password, a personal identification number (PIN), etc.), financial information, enterprise information, and so forth. The glasses device, for example, includes a display device on which sensitive content is displayable and a front surface through which the sensitive content may be viewed by a secondary person. For instance, the front surface includes a front lens and/or set of front lenses via which sensitive content may be exposed, such as based on a reflection of sensitive content from the display device onto the front lens(es).

Accordingly, based on determining that sensitive content is to be displayed and/or is currently being displayed, a determination is made whether a secondary person is positioned to enable the secondary person to view the sensitive content. The glasses device, for example, utilizes image capture from a camera (e.g., visual data) of a surrounding environment to determine if a secondary person is present and whether gaze data for the secondary person indicates that a front surface of the glasses device is viewable by the secondary person. In a scenario where the glasses device determines that the sensitive content is viewable based on gaze status of a secondary person, a protection process is implemented to mitigate exposure of the sensitive content to the secondary person. Examples of a protection process include presenting a warning notification to a user of the glasses device that sensitive content is viewable by a secondary person, removing sensitive content from display, closing a process (e.g., application) that presents the sensitive content, darkening lenses on a front surface of the glasses device to reduce viewability of the sensitive content to a secondary person, and so forth.

Accordingly, the described techniques are automated and are able to detect viewability of sensitive content presented on a glasses device to a secondary person and implement protective procedures for mitigating viewability of the sensitive content to secondary persons. Generally, this increases data security for a glasses device.

While features and concepts of content protection for a glasses device can be implemented in any number of environments and/or configurations, aspects the described techniques are described in the context of the following example systems, devices, and methods. Further, the systems, devices, and methods described herein are interchangeable in various ways to provide for a wide variety of implementations and operational scenarios.

FIG. 1 illustrates an example environment 100 in which aspects of content protection for a glasses device can be implemented. The environment 100 includes a glasses device 102 and a client device 104 associated with a user 106. In at least one implementation the glasses device 102 and the client device 104 are interconnectable such as via wireless and/or wired connectivity. Generally, the glasses device 102 represents an instance of a smart glasses device such as augmented reality (AR) glasses. Further, the client device 104 can be implemented in various ways and according to various form factors such as a smartphone, tablet device, a laptop computer, a wearable computing device, and so forth.

The glasses device 102 includes various functionalities that enable the glasses device 102 to perform different aspects of content protection for a glasses device discussed herein, including a connectivity module 108, an operating system 110, display devices 112, a display manager 114, cameras 116, applications 118, an object detector module 120, and a protection module 122. The connectivity module 108 represents functionality (e.g., logic and hardware) for enabling the glasses device 102 to interconnect with other devices and/or networks, such as the client device 104. The connectivity module 108, for instance, enables wireless and/or wired connectivity of the glasses device 102. In a wireless scenario the connectivity module 108 enables connectivity and data communication via a variety of different wireless protocols, such as wireless broadband, Wireless Local Area Network (WLAN) (e.g., Wi-Fi), Wi-Fi Direct, wireless short distance communication (e.g., Bluetooth™ (including Bluetooth™ Low Energy (BLE)), Near Field Communication (NFC)), and so forth.

The operating system 110 represents functionality for managing hardware and software resources of the glasses device 102, such as for invoking and enabling communication between hardware and software resources. The display devices 112 represent functionality for visual output of content by the glasses device 102. In an example implementation the display devices 112 include a display surface and/or set of display surfaces and a projection device for projecting visual content onto the display surface(s). The display manager 114 represents functionality for controlling the display devices 112 such as for enabling content to be provided to the display devices 112 for display. Further, the display manager 114 enables state information for the display devices 112 to be provided to other functionalities of the glasses device 102, such as enabling determination of types and/or instances of content being output by the display devices 112.

The cameras 116 represent functionality for capturing visual attributes of an environment surrounding the glasses device 102, such as for capturing visual attributes of physical objects in proximity to the glasses device 102. The applications 118 represent functionality for performing various tasks via the glasses device 102, such as productivity tasks, gaming, web browsing, social media, and so forth. The object detector module 120 represents functionality for detecting objects in proximity to the glasses device 102, such as human features detected in an environment in which the glasses device 102 is positioned. For instance, the object detector module 120 processes image data captured by the cameras 116 to determine whether human features are detected in proximity to the glasses device 102. Further, the object detector module 120 implements a gaze detector module 124 to determine whether a human gaze is detected and attributes of a detected human gaze, such a position and direction of a human gaze relative to the glasses device 102.

The protection module 122 represents functionality for implementing various aspects of content protection for a glasses device described herein. For instance, the protection module 122 receives human gaze data from the object detector module 120 and determines whether to implement a security procedure based on the human gaze data. Consider, for example, a scenario where display content 126 is displayed on the display devices 112. The display content 126, for instance, includes virtual displays 128 that are displayed by (e.g., projected onto) the display devices 112. Generally, the virtual displays 128 can be populated with various types of content, such as content generated by the applications 118.

Further to this example scenario, the protection module 122 determines that the display content 126 includes sensitive information. Further, the protection module 122 determines based on gaze information received from the gaze detector module 124 that a human gaze is detected that is positioned to enable a secondary person (e.g., a person other than the user 106) to view the display content 126. Accordingly, the protection module 122 implements a protection process such as to notify the user 106 that the display content 126 is potentially viewable by another party. For instance, the protection module 122 is operable to expose a protection graphical user interface (GUI) 130 on the virtual displays 128 that notifies the user 106 of a potential exposure of the display content 126 to another person and can provide suggestions for protecting the display content. Additionally or alternatively, as part of a protection process the protection module 122 is operable to implement an automated protection process such as to visually obscure sensitive portions of the display content 126 and/or to alter (e.g., darken) an outer surface of the glasses device 102 to reduce the visibility of the display content 126 to persons viewing the glasses device 102 from an external perspective.

The client device 104 includes functionality that enables the client device 104 to participate in various aspects of content protection for a glasses device described herein including a connectivity module 132, applications 134, and sensors 136. The connectivity module 132 represents functionality (e.g., logic and hardware) for enabling the client device 104 to interconnect with other devices and/or networks, such as the glasses device 102. The connectivity module 132, for instance, enables wireless and/or wired connectivity of the client device 104. The applications 134 represent functionality for performing various tasks via the client device 104, such as productivity tasks, gaming, web browsing, social media, and so forth. In at least one implementation content from the applications 134 is communicated to the glasses device 102 for output via the display devices 112. For instance, the display content 126 represents content generated by an instance of the applications 134 and communicated to the glasses device 102 for output by the display devices 112. In at least one implementation, for example, instances of the applications 118 represent instances of the applications 134 executed by the client device 104 and communicated to the glasses device 102 for display by the display devices 112.

The sensors 136 are representative of functionality to detect various physical and/or logical phenomena in relation to the client device 104 and/or the glasses device 102, such as motion, light, image detection and recognition, time and date, position, location, touch detection, temperature, and so forth. In this particular example the sensors 136 include cameras 138 which are configured to capture visual aspects of an environment surrounding the client device 104. Other examples of the sensors 136 include hardware and/or logical sensors such as an accelerometer, a gyroscope, a microphone, a clock, biometric sensors, touch input sensors, position sensors, environmental sensors (e.g., for temperature, pressure, humidity, and so on), geographical location information sensors (e.g., Global Positioning System (GPS) functionality), and so forth. In at least one implementation the sensors 136 generate sensor data 140 and communicate the sensor data 140 to the glasses device 102. The glasses device 102 can utilize the sensor data 140 for various purposes, such as to assist in detection of persons other than the user 106 in proximity to the glasses device 102.

Having discussed an example environment in which the disclosed techniques can be performed, consider now some example scenarios and implementation details for implementing the disclosed techniques.

Figure 2:
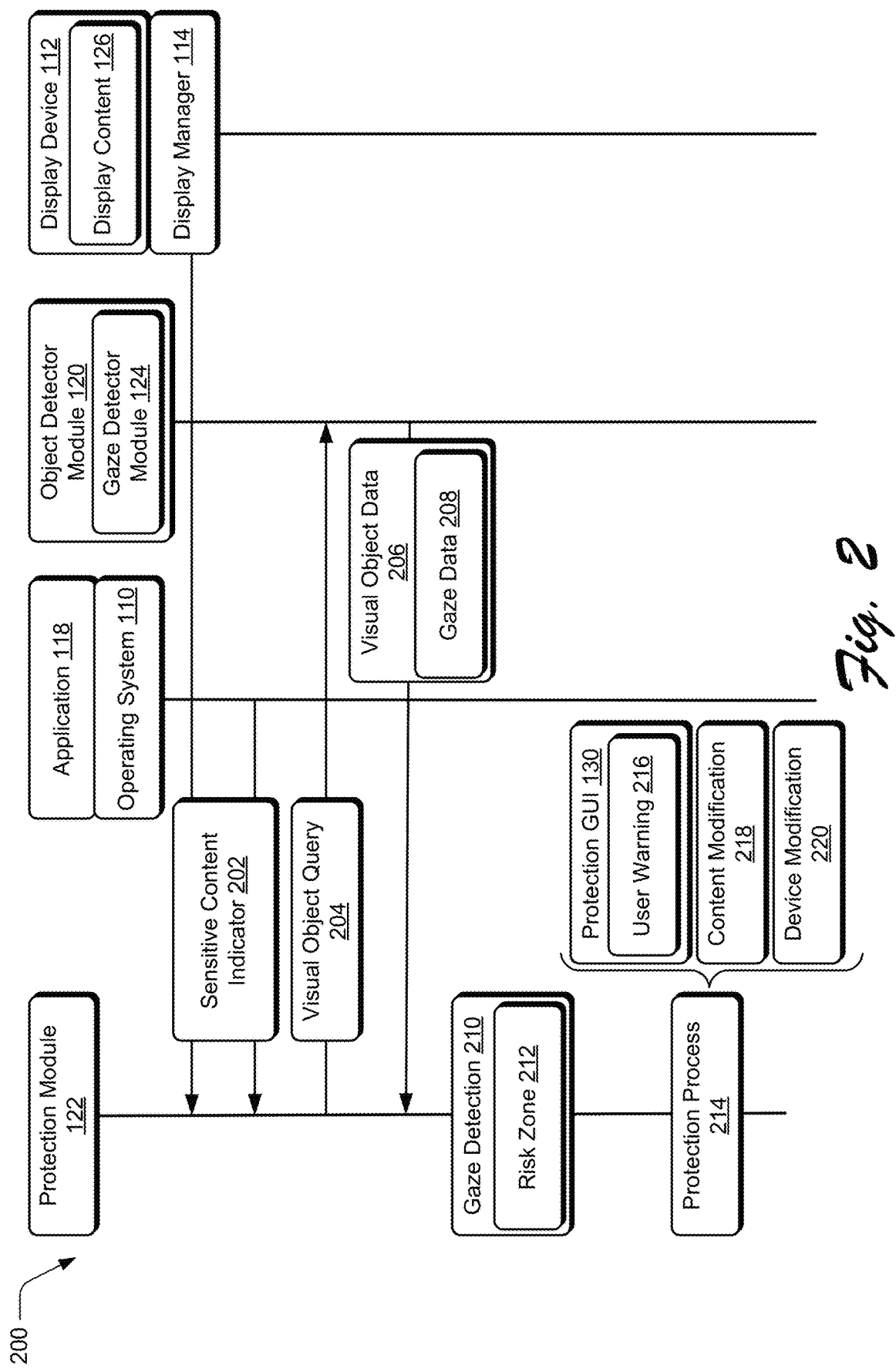
FIG. 2 depicts an example system for content protection for a glasses device in accordance with one or more implementations.

FIG. 2 depicts an example system 200 for content protection for a glasses device in accordance with one or more implementations. Generally, the system 200 can be implemented in the environment 100 and incorporates attributes of the environment 100 introduced above. In the system 200 the protection module 122 receives a sensitive content indicator 202 indicating that sensitive content is pending display on a display device 112 and/or is currently being displayed on a display device 112. Generally, the sensitive content indicator 202 is receivable from various entities such as the display manager 114, an application 118, and/or the operating system 110. In at least one implementation, for example, a user invokes the application 118 to present display content 126 and the application 118 and/or the operating system 110 determine that the display content 126 includes sensitive content. Alternatively or additionally a user invokes functionality of the operating system 110 (e.g., authentication functionality) and the operating system 110 determines that the functionality involves the output of sensitive content. Generally, the display content 126 is identifiable as sensitive content in various ways, such as based on a content type for the display content 126, e.g., personally identifiable information (PII), authentication information (e.g., a password, a personal identification number (PIN), etc.), financial information, enterprise information, and so forth. Alternatively or additionally the display content 126 is flagged as sensitive content.

Accordingly, based on the sensitive content indicator 202 the protection module 122 communicates a visual object query 204 to the object detector module 120. The visual object query 204, for instance, requests data describing visual objects captured by the cameras 116. Based on the visual object query 204 the object detector module 120 retrieves visual object data 206 from the cameras 116 that describes visual objects detected in proximity to the glasses device 102. The visual object data 206, for example, includes human features detected in captured visual data, such as facial features as well as other bodily features such as torsos, legs, full body features, posture information (e.g., standing, sitting), and so forth. In this particular example the visual object data 206 includes gaze data 208 extracted by the gaze detector module 124. For example, the gaze data 208 describes features of human gaze detected in captured visual data, such as human gaze direction relative to the glasses device 102.

Further to the system 200 the protection module 122 processes the visual object data 206 including the gaze data 208 to perform gaze detection 210. The gaze detection 210, for instance, determines whether a human gaze is detected as well as status of human gaze, e.g., direction of human gaze relative to the glasses device 102. In this particular example the gaze detection 210 determines that a human gaze is detected as incident on the glasses device 102, e.g., a front surface of the glasses device 102. For example, and as further detailed below, a risk zone 212 is defined relative to the glasses device 102 that corresponds to an area in an environment surrounding the glasses device 102. Accordingly, when the gaze detection 210 determines that a human gaze is detected as being directed toward the glasses device 102 within the risk zone 212, the gaze detection 210 indicates that a human gaze is positioned to enable a secondary person to view the display content 126.

In response to the gaze detection 210 the protection module 122 implements a protection process 214 to enable various actions to be taken to mitigate the possibility of a secondary person viewing the display content 126. Generally, the protection process 214 is implementable in various ways. For instance, the protection module 122 exposes the protection GUI 130 to include a user warning 216 that notifies a user of the glasses device 102 that the display content 126 is viewable by another person in proximity to the glasses device. The user warning, for example, suggests that the user move to a different position such that a human gaze is not detected within the risk zone 212 and/or suggests that the user remove the display content 126 from display on the display device 112.

As another example the protection module 122 causes content modification 218 that modifies the display content 126 to prevent the display content 126 from being discernable to another person viewing the glasses device 102 from an external perspective. The content modification 218, for example, causes the display content 126 to be visually obscured (e.g., greyed out and/or scrambled) on the display device 112. As yet another example the protection process 214 includes device modification 220 that modifies the glasses device 102 to mitigate the ability of the display content 126 to be viewable from an external perspective, e.g., by a secondary person viewing the display device 112 from an external perspective. As discussed below, for example, front lenses of the glasses device 102 include an electrochromic portion that enables color and/or tinting of the front lenses to be modified by applying a signal (e.g., a voltage) to the front lenses. For instance, the front lenses include an electrochromic layer and/or layers on an external surface that respond to an applied voltage by changing color and/or tinting of the external surface. Accordingly, the device modification 220 is implementable by applying a signal to an electrochromic portion of the front lenses to darken and/or color the front lenses to mitigate the ability of the display content 126 to be viewable from an external perspective.

Generally, any one or combination of these implementations of the protection process 214 can be implemented to mitigate the viewability of display content 126 by a secondary person viewing the display device 112 from an external perspective.

Figure 3A:
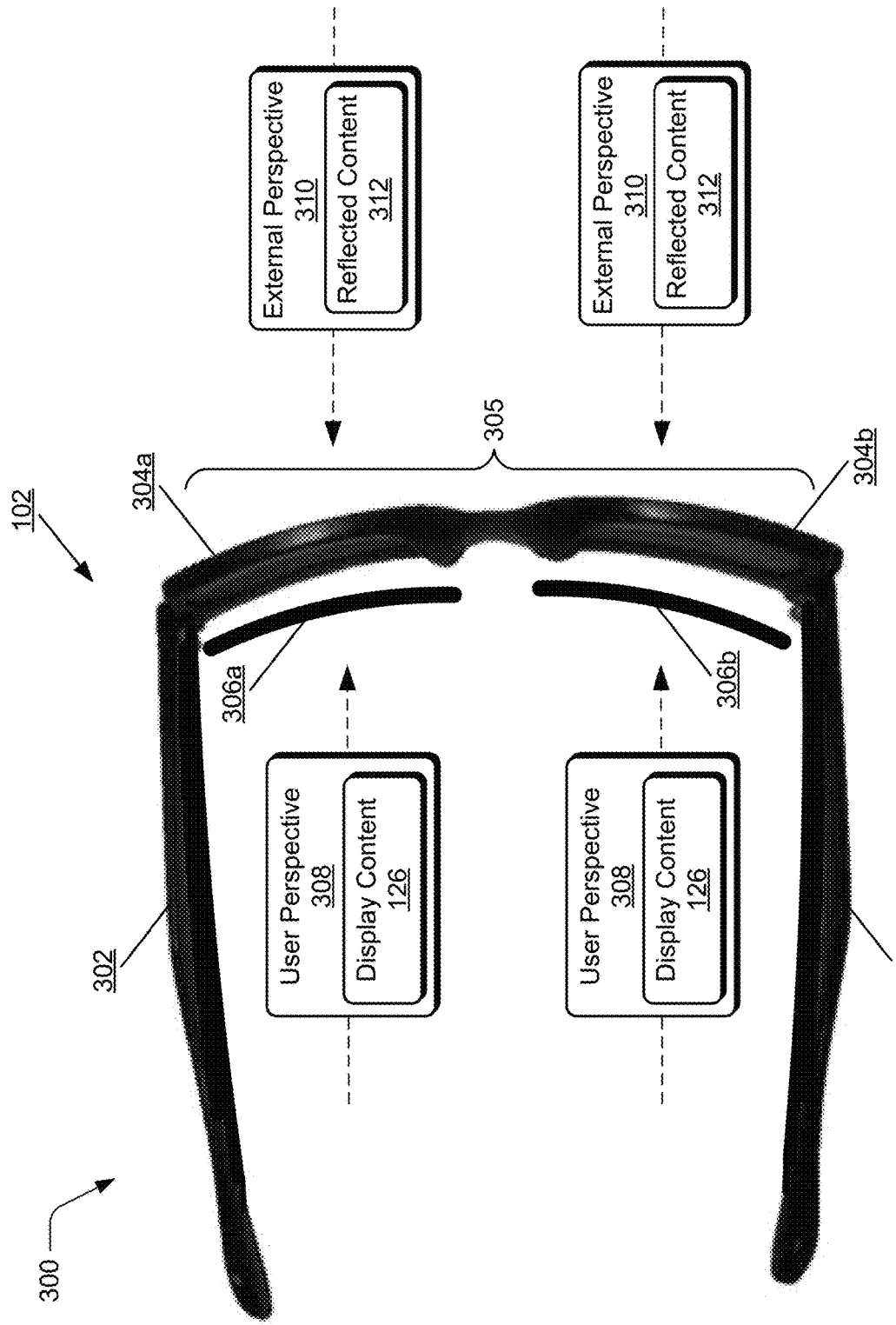
FIG. 3a depicts example features and attributes of a glasses device in accordance with one or more implementations.

FIG. 3a depicts example features and attributes of the glasses device 102 in accordance with one or more implementations. In this example an underside view 300 of the glasses device 102 is depicted with certain features removed for discussion purposes. The glasses device 102 includes a glasses body 302, a front lens 304a and a front lens 304b, a display device 306a, and a display device 306b. The display devices 306a, 306b, for instance, represent instances of the display devices 112. Further, the front lenses 304a, 304b represent outer lenses on a front surface 305 of the glasses device 102 that are transparent and enable a user of the glasses device 102 to view real-world objects outside of the glasses device 102. In at least one implementation display content 126 is output on the display devices 306 and is not directly presented by the glasses device 102 on the outer lenses 304a, 304b.

A user view perspective ("User Perspective") 308 is illustrated that indicates a perspective from which a using wearer of the glasses device 102 views the display devices 306a, 306b. For instance, in an operational scenario, display content 126 is presented on (e.g., projected onto) the display devices 306a, 306b for a user to view via the user perspective 308. An external perspective 310 is also illustrated that indicates a perspective of a secondary person viewing the glasses device 102 from a perspective external to the glasses device 102, e.g., a non-user person. A secondary person viewing the glasses device 102 from the external perspective 310, for instance, is able to view the outer lenses 304a, 304b but is not able to view the display content 126 presented on the display devices 306a, 306b from the user perspective 308. However, due do positioning of the display devices 306a, 306b adjacent the outer lenses 304a, 304b, the display content 126 can be visually reflected from the display devices 306a, 306b onto the outer lenses 304a, 304b as reflected content 312. Thus, as discussed below, a secondary person viewing the outer lenses 304a, 304b from certain perspectives can view the reflected content 312 and may be able to discern attributes of the display content 126, such as sensitive information included in the display content 126. Accordingly, techniques described herein enable persons potentially viewing the glasses device 102 from the external perspective 310 to be detected and provide different protection processes 214 for mitigating the ability of such persons to view and discern sensitive information presented as part of the display content 126 and represented in the reflected content 312.

FIG. 3b depicts a scenario 314 for defining a risk zone in accordance with one or more implementations. In the scenario 314 the protection module 122 defines the risk zone 212 as a subarea of a field of view 316 of the cameras 116. The cameras 116, for instance, are positioned on the glasses device 102 to capture visual objects within the field of view 316 from the front surface 305 of the glasses device 102. Accordingly, the protection module 122 defines the risk zone 212 as a subregion of the field of view 316. Generally, the risk zone 212 represents a region within which content displayed on the display devices 112 is viewable (e.g., visually discernable) to a secondary person. For instance, as described in FIG. 3a, display content 126 displayed on the display devices 112 can be reflected onto the outer lenses 304a, 304b such that a person viewing the outer lenses 304a, 304b from an external perspective and from within the risk zone 212 may be able to visually discern portions of the display content 126.

Figure 4A:
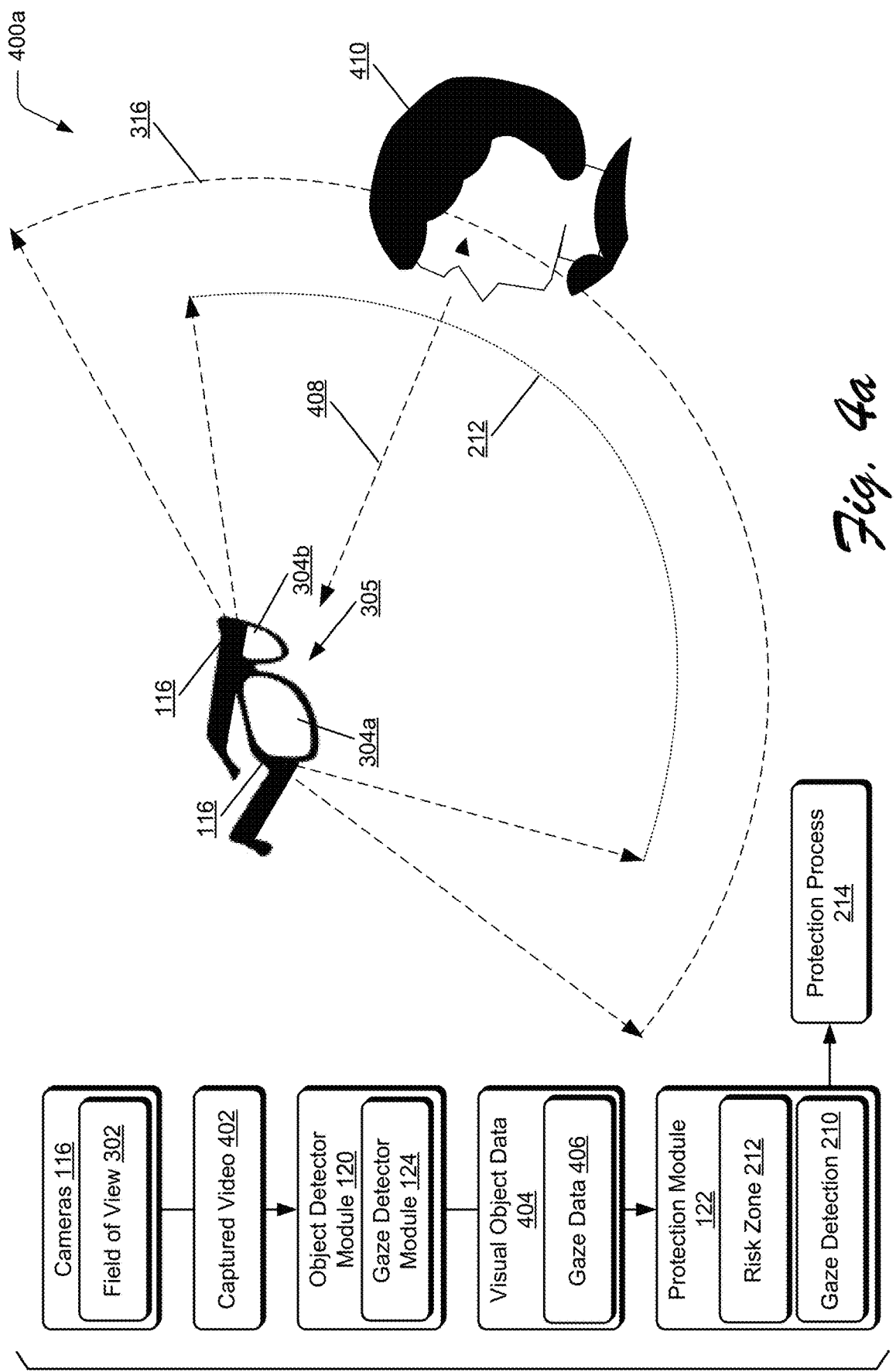
FIG. 4a depicts a scenario for determining whether a human gaze is detected in accordance with one or more implementations.

FIG. 4a depicts a scenario 400a for determining whether a gaze is detected in accordance with one or more implementations. In the scenario 400a the cameras 116 capture captured video 402 from within the field of view 316 and communicate the captured video 402 to the object detector module 120. The object detector module 120 processes the captured video 402 to the generate visual object data 404 including gaze data 406 which includes attributes of user gaze detected from the capture video 402. The object detector module 120 communicates the visual object data 404 with the gaze data 406 to the protection module 122, and the protection module 122 performs gaze detection 210 using the visual object data 404 and the gaze data 406 to determine that a human gaze is detected within the risk zone 212. For instance, the protection module 122 identifies a gaze vector 408 of a secondary person 410 and determines that the gaze vector 408 overlaps with the risk zone 212. Accordingly, the protection module 122 can implement a protection process 214, examples of which are described throughout this disclosure.

Figure 4B:
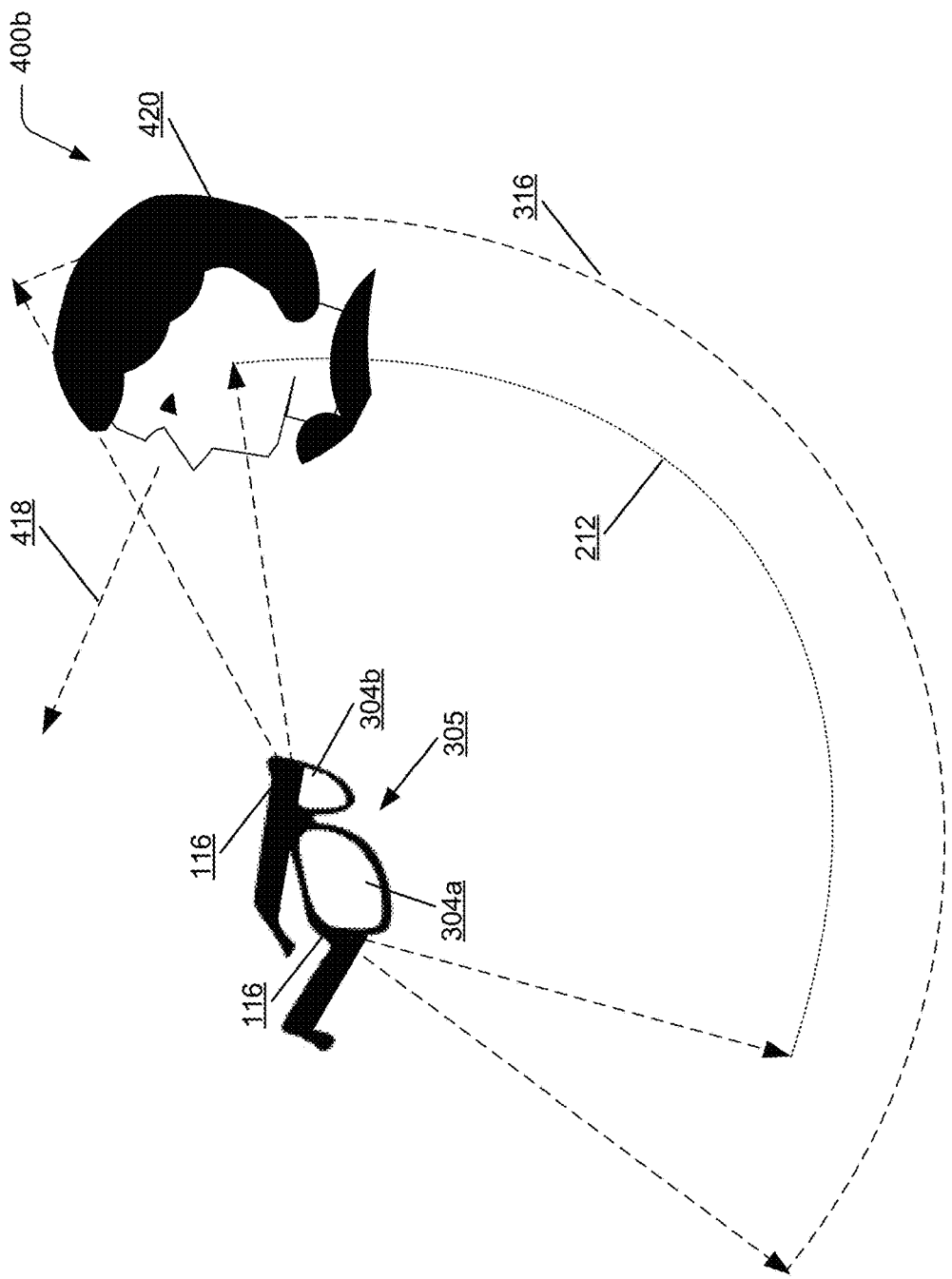
FIG. 4b depicts a scenario for determining whether a human gaze is detected in accordance with one or more implementations.
Figure 4B:
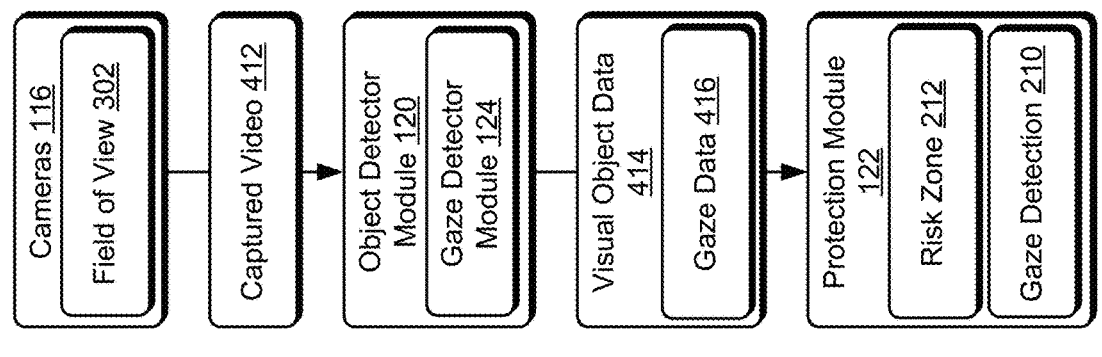

FIG. 4b depicts a scenario 400b for determining whether a gaze is detected in accordance with one or more implementations. In the scenario 400b the cameras 116 capture captured video 412 from within the field of view 316 and communicate the captured video 412 to the object detector module 120. The object detector module 120 processes the captured video 412 to generate visual object data 414 including gaze data 416 which includes attributes of user gaze detected from the capture video 412. The object detector module 120 communicates the visual object data 414 with the gaze data 416 to the protection module 122, and the protection module 122 executes the gaze detection 210 on the gaze data 416 to determine that no human gaze is detected within the risk zone 212. For instance, the protection module 122 identifies a gaze vector 418 of a secondary person 420 and determines that the gaze vector 418 is not within (e.g., does not overlap with) the risk zone 212. Thus, the protection module 122 does not implement a protection process. Alternatively to identifying the gaze vector 418 of the secondary person 420, the gaze data 416 is null (e.g., does not identify a human gaze) and thus the protection module 122 does not identify a human gaze within the risk zone 212 and does not implement a protection process 214.

Generally, the scenarios 400a, 400b are performable dynamically to identify changes in user gaze attributes and to determine whether to implement a protection process.

Figure 5:
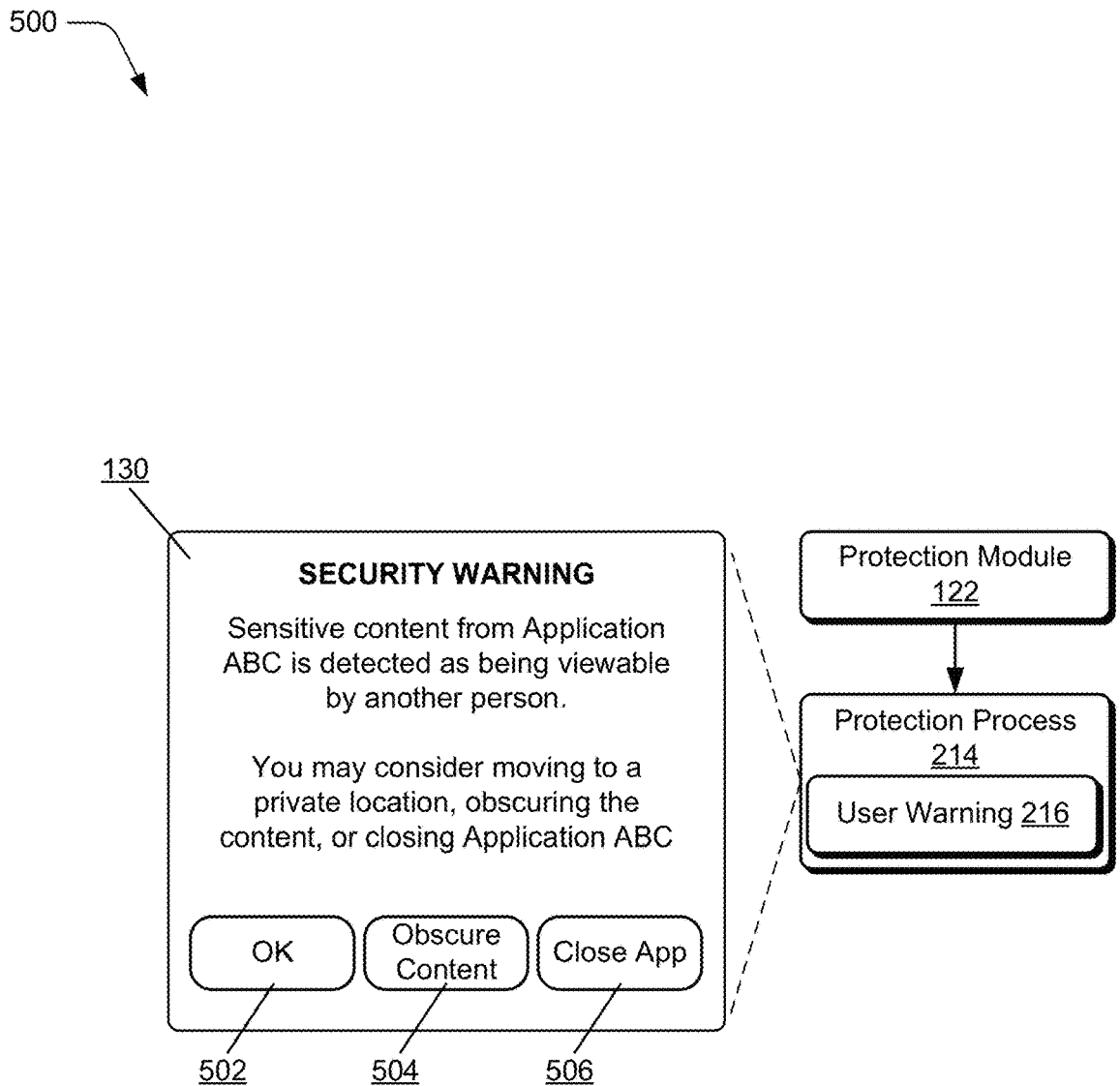
FIG. 5 depicts a scenario for providing a user notification of a potential exposure of sensitive content in accordance with one or more implementations.

FIG. 5 depicts a scenario for providing a user notification of a potential exposure of sensitive content in accordance with one or more implementations. In the scenario 500 as part of a protection process 214 the protection module 122 generates and outputs an instance of the protection GUI 130 on the glasses device 102 and that includes a user warning 216. The protection process 214, for instance, is implemented in response to detecting a human gaze within a risk zone such as described above. Generally, the user warning 216 includes a notification to a user that sensitive content is viewable by another person and identifies a source of the sensitive content. In this particular example the source of the sensitive content is an application ("Application ABC") which represents an instance of the applications 118 and/or applications 134. This is not to be construed as limiting, however, and sensitive content can be presented by a variety of different functionalities and entities.

The user warning 216 also includes suggestions for preventing the sensitive content from being exposed to another person such as moving to a secure location to view the sensitive content, visually obscuring the sensitive content, or removing the source of the sensitive content from view, e.g., closing the application that is the source of the sensitive content.

Also included in the protection GUI 130 are an acknowledge control 502, an obscure control 504, and a terminate control 506. The acknowledge control 502 is selectable to cause the protection GUI 130 to be removed from display. For instance, selection of the acknowledge control 502 causes removal of the protection GUI 130 and display of the sensitive content by the glasses device 102 to proceed. The obscure control 504 is selectable to cause sensitive content to be visually obscured, such as by greying out and/or scrambling sensitive content displayed on the display devices 112. The terminate control 506 is selectable to cause the sensitive content to be removed from display. For instance, in a scenario where the sensitive content is presented by an application, selecting the terminate control 506 closes the application or prevents the application from opening. For example, in a scenario where the application has been launched and is currently executing, selecting the terminate control 506 closes the application.

As another example, consider a scenario where a user performs an action to launch an application. Based on the application launch action the protection module 122 determines that the application is associated with sensitive content and also determines that a human gaze is detected within a risk zone relative to the glasses device 102. Accordingly, based on detecting the human gaze and potential presentation of sensitive content by the application, the protection module 122 causes launch of the application to be paused and presents the user warning 216. A user can select the acknowledge control 502 to remove the user warning 216 and allow the application to continue launching, or can select the terminate control 506 to prevent the application from launching. Thus, the user warning 216 can be output prior to display of sensitive content to enable display of the sensitive content to be prevented.

Figure 6:
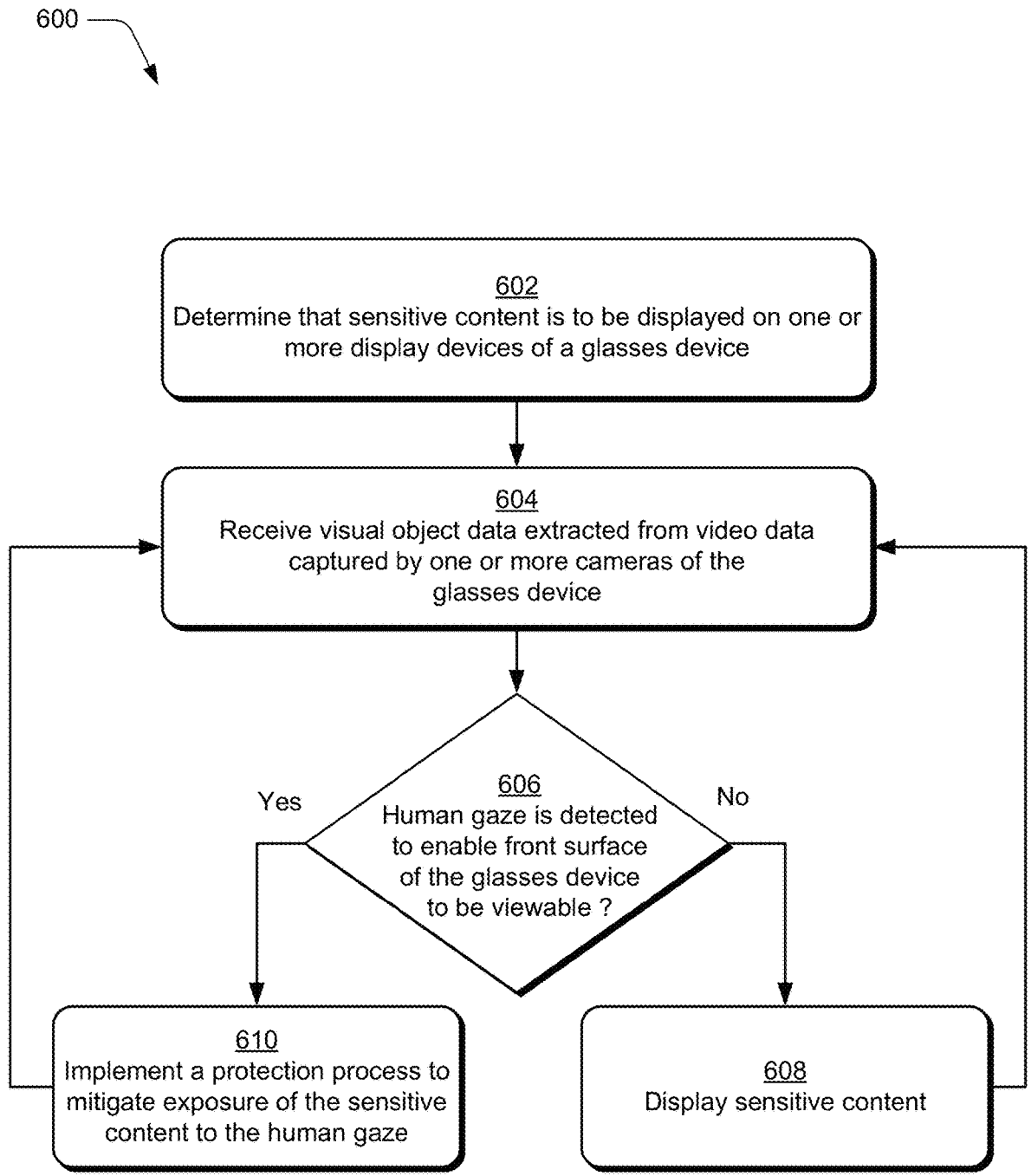
FIG. 6 illustrates a flow chart depicting an example method for mitigating exposure of sensitive content on a glasses device in accordance with one or more implementations.

FIG. 6 illustrates a flow chart depicting an example method 600 for mitigating exposure of sensitive content on a glasses device in accordance with one or more implementations. At 602 it is determined that sensitive content is to be displayed on one or more display devices of a glasses device. The protection module 122, for instance, determines that sensitive content is to be displayed on a display device 112. Generally, the determination of sensitive content is determinable in various ways, such as based on a notification from an application 118, from the operating system 110, from the display manager 114, and so forth.

At 604 visual object data extracted from visual data captured by one or more cameras of the glasses device is received. Generally, visual data represents data that captures a visual environment in which the glasses device 102 is positioned and can be captured in various ways such as video data, still images, and so forth. The object detector module 120, for instance, receives visual data captured by the cameras 116 and processes the visual data to extract and identify visual objects from the visual data. The visual object data, for instance, describes visual objects detected in proximity to the front surface 305 of the glasses device. Generally, the object detector module 120 utilizes any suitable implementation of object extraction and image recognition algorithms that apply feature recognition techniques to recognize visual objects present in the visual data.

At 606 it is determined whether a human gaze is detected from the visual object data as being positioned to enable the front surface of the glasses device to be viewable by the human gaze. The protection module 122, for instance, determines whether a human gaze is detected that is positioned to enable the front surface 305 of the glasses device 102 to be viewable by a secondary person. In at least one implementation determining whether the front surface 305 is viewable is based on determining whether a direction of a human gaze (e.g., a gaze vector) is directed toward the front surface 305, e.g., within the risk zone 212. Generally, detection of human gaze relative to the front surface 305 of the glasses device 102 can utilize various types of data such as visual data captured by the cameras 116 and optionally sensor data 140 captured by the sensors 136 of the client device 104. For instance, the sensor data 140 includes human attributes such as facial features and/or other body features detected by the sensors 136, and the protection module 122 utilizes the sensor data to detect presence of a secondary person is proximity to the glasses device 102 and/or attributes of human gaze of a secondary person.

If it is determined that a human gaze is not detected as being positioned to enable the front surface of the glasses device to be viewable by the human gaze ("No"), at 608 the sensitive content is displayed. The protection module 122, for instance, determines that a human gaze is not detected that is positioned to enable the front surface 305 of the glasses device 102 to be viewable by a person, and thus sensitive content is permitted to be displayed. A protection process 214, for example, is not implemented.

If it is determined that a human gaze is detected as being positioned to enable the front surface of the glasses device to be viewable by the human gaze ("Yes"), at 610 a protection process is implemented to mitigate exposure of the sensitive content to the human gaze. For example, the protection module 122 determines that a human gaze is detected within a risk zone 212 and executes a protection process 214. In at least one implementation determining that a human gaze is detected includes determining that a human gaze is detected as incident upon the front surface 305 of the glasses device 102. Examples of protection processes 214 are discussed throughout this disclosure.

According to implementations described herein the method 600 can be implemented dynamically to adapt to changes in human gaze detection. For instance, if a human gaze is not detected and sensitive content is displayed (e.g., at 608) and then a human gaze is subsequently detected, the method proceeds to step 610. Further, if a human gaze is detected and a protection process 214 is executed (e.g., at 610) and then a human gaze is subsequently not detected, the method proceeds to step 608 such that sensitive content is displayed.

Figure 7:
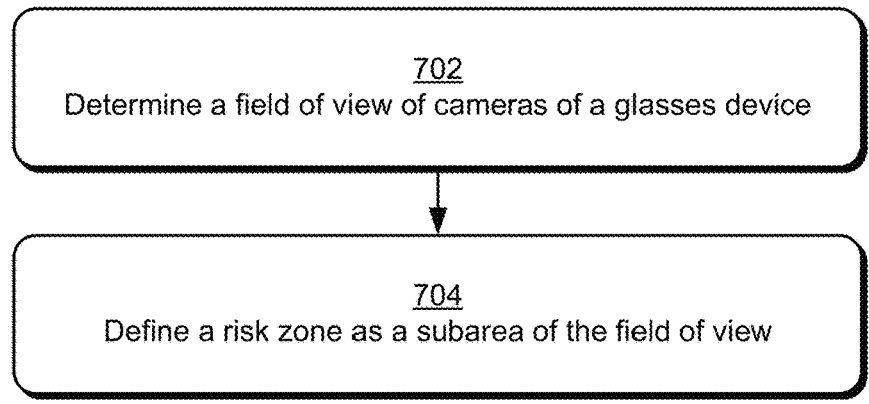
FIG. 7 illustrates a flow chart depicting an example method for utilizing a risk zone for determining whether a human gaze is positioned such that sensitive content is viewable in accordance with one or more implementations.

FIG. 7 illustrates a flow chart depicting an example method 700 for utilizing a risk zone for determining whether a human gaze is positioned such that sensitive content is viewable in accordance with one or more implementations. The method 700, for example, is implemented in conjunction with the method 600 to enable human gaze detection, e.g., as part of step 606. At 702 a field of view of cameras of a glasses device is determined. The protection module 122, for example, receives a video feed from the cameras 116 and identifies a field of view 316 of the cameras 116 from the video feed. In at least one implementation the field of view represents an area extending from the front surface 305 of the glasses device 102 and that is capturable by the cameras 116.

At 704 a risk zone is defined as a subarea of the field of view. The protection module 122, for example, defines a risk zone 212 as a portion of a field of view 316 of the cameras 116 in which a human gaze is able to view display content 126 displayed on display devices 112. For instance, in certain portions of the field of view 316 outside of the risk zone 212, display content 126 is determined to be not at risk of being discernable to a human gaze. Within the risk zone 212, however, a detected human gaze is determined as being positioned to enable display content 126 to be discernable to the human gaze.

Figure 8:
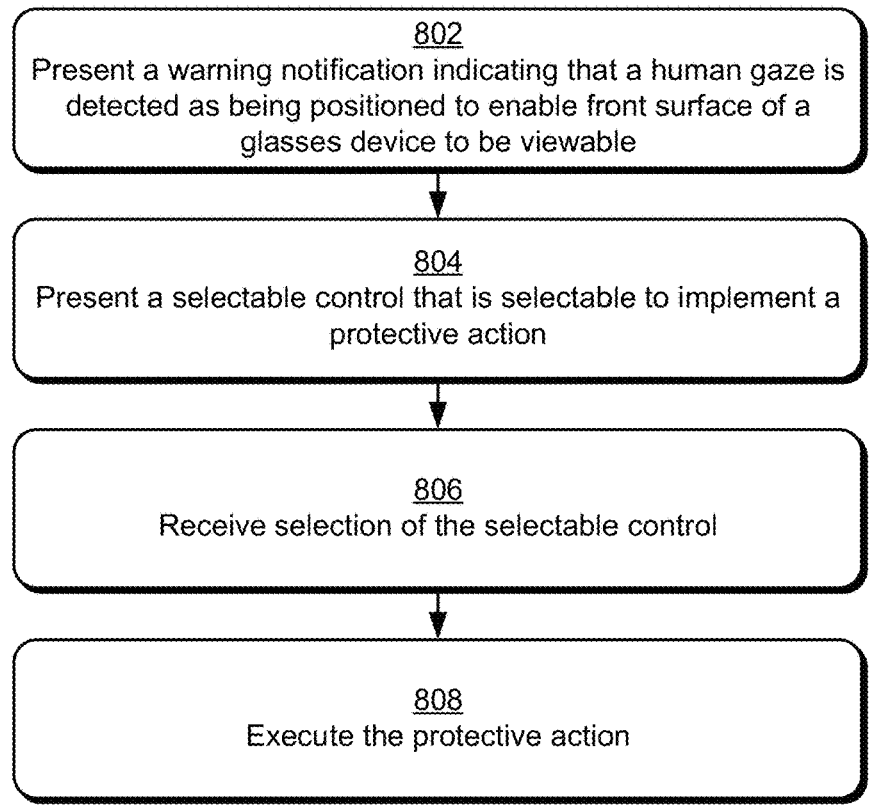
FIG. 8 illustrates a flow chart depicting an example method for implementing a protection procedure for protecting sensitive content in accordance with one or more implementations.

FIG. 8 illustrates a flow chart depicting an example method 800 for implementing a protection procedure for protecting sensitive content in accordance with one or more implementations. The method 800, for example, is implemented in conjunction with the method 600 to enable human gaze detection, e.g., as part of step 610. At 802 a warning notification is presented indicating that a human gaze is detected as being positioned to enable a front surface of a glasses device to be viewable. The protection module 122, for example, determines that a human gaze is detected as positioned to enable the front surface 305 to be viewable (e.g., within a risk zone 212) and outputs the protection GUI 130 with a notification warning that sensitive content is viewable. In at least one implementation the notification includes a suggestion for protecting the sensitive content, such as moving to a secure location, removing the sensitive content from display, closing an application that includes the sensitive content, preventing launch of an application that includes sensitive content, and so forth.

At 804 a selectable control is presented that is selectable to implement a protective action. The protection module 122, for example, presents a selectable control and/or set of selectable controls that are selectable to cause a protective action to be executed. Examples of protective actions include removing sensitive content from display, closing an application that includes sensitive content, preventing launch of an application that includes sensitive content, visually obscuring sensitive content, modifying color and/or shading of the lenses 304, and so forth.

At 806 a selection of the selectable control is received. The protection module 122, for instance, receives an indication of a user selection of the selectable control. At 808 the protective action is executed. For example, the protection module 122 executes a protective action associated with the selectable control, such as removing sensitive content from display, closing an application that includes sensitive content, preventing launch of an application that includes sensitive content, visually obscuring sensitive content, modifying color and/or shading of the lenses 304, and so forth.

The example methods described above may be performed in various ways, such as for implementing different aspects of the systems and scenarios described herein. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Figure 9:
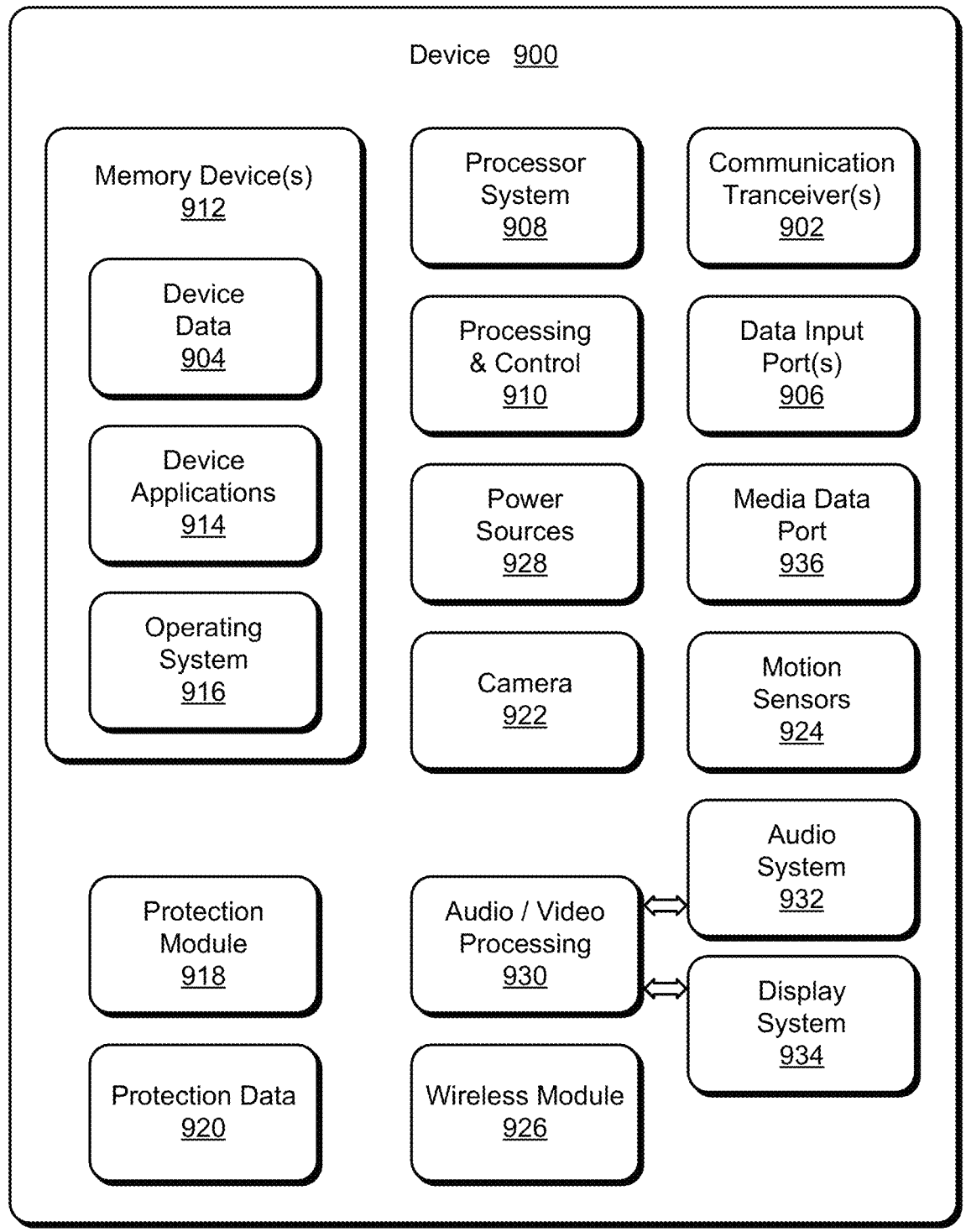
FIG. 9 illustrates various components of an example device in which aspects of content protection for a glasses device can be implemented.

FIG. 9 illustrates various components of an example device 900 in which aspects of content protection for a glasses device can be implemented. The example device 900 can be implemented as any of the devices described with reference to the previous FIGS. 1-8, such as any type of mobile device, mobile phone, mobile device, wearable device, tablet, computing, communication, entertainment, gaming, media playback, and/or other type of electronic device. For example, the glasses device 102 and/or the client device 104 as shown and described with reference to FIGS. 1-8 may be implemented as the example device 900.

The device 900 includes communication transceivers 902 that enable wired and/or wireless communication of device data 904 with other devices. The device data 904 can include any of device identifying data, device location data, wireless connectivity data, and wireless protocol data. Additionally, the device data 904 can include any type of audio, video, and/or image data. Example communication transceivers 902 include wireless personal area network (WPAN) radios compliant with various IEEE 902.15 (Bluetooth™) standards, wireless local area network (WLAN) radios compliant with any of the various IEEE 902.11 (Wi-Fi™) standards, wireless wide area network (WWAN) radios for cellular phone communication, wireless metropolitan area network (WMAN) radios compliant with various IEEE 902.16 (WiMAX™) standards, and wired local area network (LAN) Ethernet transceivers for network data communication.

The device 900 may also include one or more data input ports 906 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 900 includes a processing system 908 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 910. The device 900 may further include any type of a system bus or other data and command transfer system that couples the various components within the device. A system bus can include any one or combination of different bus structures and architectures, as well as control and data lines.

The device 900 also includes computer-readable storage memory 912 (e.g., memory devices) that enable data storage, such as data storage devices that can be accessed by a computing device, and that provide persistent storage of data and executable instructions (e.g., software applications, programs, functions, and the like). Examples of the computer-readable storage memory 912 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 900 may also include a mass storage media device.

The computer-readable storage memory 912 provides data storage mechanisms to store the device data 904, other types of information and/or data, and various device applications 914 (e.g., software applications). For example, an operating system 916 can be maintained as software instructions with a memory device and executed by the processing system 908. The device applications may also include a device manager, such as any form of a control application, software application, signal-processing and control module, code that is native to a particular device, a hardware abstraction layer for a particular device, and so on. Computer-readable storage memory 912 represents media and/or devices that enable persistent and/or non-transitory storage of information in contrast to mere signal transmission, carrier waves, or signals per se. Computer-readable storage memory 912 do not include signals per se or transitory signals.

In this example, the device 900 includes a protection module 918 that implements aspects of content protection for a glasses device and may be implemented with hardware components and/or in software as one of the device applications 914. For example, the protection module 918 can be implemented as the protection module 122 described in detail above. In implementations, the protection module 918 may include independent processing, memory, and logic components as a computing and/or electronic device integrated with the device 900. The device 900 also includes protection data 920 for implementing aspects of content protection for a glasses device and may include data from the protection module 918, such as data for identifying sensitive content and/or data for identifying attributes of human gaze.

In this example, the example device 900 also includes a camera 922 and motion sensors 924, such as may be implemented in an inertial measurement unit (IMU). The motion sensors 924 can be implemented with various sensors, such as a gyroscope, an accelerometer, and/or other types of motion sensors to sense motion of the device. The various motion sensors 924 may also be implemented as components of an inertial measurement unit in the device.

The device 900 also includes a wireless module 926, which is representative of functionality to perform various wireless communication tasks. The device 900 can also include one or more power sources 928, such as when the device is implemented as a mobile device. The power sources 928 may include a charging and/or power system, and can be implemented as a flexible strip battery, a rechargeable battery, a charged super-capacitor, and/or any other type of active or passive power source.

The device 900 also includes an audio and/or video processing system 930 that generates audio data for an audio system 932 and/or generates display data for a display system 934. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 936. In implementations, the audio system and/or the display system are integrated components of the example device. Alternatively, the audio system and/or the display system are external, peripheral components to the example device.

Although implementations of content protection for a glasses device have been described in language specific to features and/or methods, the subject of the appended claims is not necessarily limited to the specific features or methods described. Rather, the features and methods are disclosed as example implementations, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

In some aspects, the techniques described herein relate to a glasses device including: one or more display devices positioned to display content from an internal perspective of the glasses device; one or more cameras positioned to capture visual data of an external perspective extending from a front surface of the glasses device; and one or more modules implemented at least in part in hardware of the glasses device to: determine that sensitive content is to be displayed as part of the content displayed on the one or more display devices; receive visual object data extracted from the visual data captured by the one or more cameras, the visual object data describing one or more visual objects detected in proximity to the front surface of the glasses device; determine based on the visual object data that a human gaze is detected as being positioned to enable the front surface of the glasses device to be viewable by the human gaze; and implement a protection process to mitigate exposure of the sensitive content to the human gaze.

In some aspects, the techniques described herein relate to a glasses device, wherein the glasses device further includes one or more outer lenses that represent at least a portion of the front surface and that are positioned adjacent and separately from the one or more display devices.

In some aspects, the techniques described herein relate to a glasses device, wherein to determine that the human gaze is detected as being positioned to enable the front surface of the glasses device to be viewable includes to determine that the human gaze is incident upon the one or more outer lenses.

In some aspects, the techniques described herein relate to a glasses device, wherein the one or more modules are further implemented to: define a risk zone as a subarea of a field of view of the one or more cameras, the field of view extending from the front surface of the glasses device, wherein to determine that the human gaze is detected as being positioned to enable the front surface of the glasses device to be viewable includes to determine that the human gaze is detected within the risk zone.

In some aspects, the techniques described herein relate to a glasses device, wherein to implement the protection process includes to present a warning notification on the glasses device indicating that the sensitive content is detected as being viewable by another person.

In some aspects, the techniques described herein relate to a glasses device, wherein to determine that sensitive content is to be displayed on the one or more display devices includes to determine that an application that includes the sensitive content is presented on the one or more display devices, and wherein the protection module is further implemented to: implement the protection process including to present a warning notification on the glasses device indicating that the sensitive content is detected as being viewable by a person other than a user of the glasses device; and present as part of the warning notification a selectable control that is selectable to cause the sensitive content to be removed from display on the one or more display devices.

In some aspects, the techniques described herein relate to a glasses device, wherein to cause the sensitive content to be removed from display includes to cause the application to be closed.

In some aspects, the techniques described herein relate to a glasses device, wherein to cause the sensitive content to be removed from display includes to cause the sensitive content to be visually obscured.

In some aspects, the techniques described herein relate to a glasses device, wherein the glasses device further includes one or more outer lenses that represent at least a portion of the front surface and that are positioned adjacent and separately from the one or more display devices, the one or more outer lenses including at least one electrochromic layer, and wherein to implement the protection process includes to control the at least one electrochromic layer to modify one or more of a shading of the one or more outer lenses or a color of the one or more outer lenses.

In some aspects, the techniques described herein relate to a method, including: determining that sensitive content is to be displayed on one or more display devices of a glasses device; receiving visual object data extracted from visual data captured by one or more cameras of the glasses device, the visual object data describing one or more visual objects detected in proximity to a front surface of the glasses device; determining based on the visual object data that a human gaze is detected as being positioned to enable the front surface of the glasses device to be viewable by the human gaze; and implementing a protection process to mitigate exposure of the sensitive content to the human gaze.

In some aspects, the techniques described herein relate to a method, wherein the determining that sensitive content is to be displayed on the one or more display devices includes receiving a notification that indicates one or more of that a process that includes sensitive content is being launched or that the sensitive content is currently being displayed on the one or more display devices.

In some aspects, the techniques described herein relate to a method, wherein the determining based on the visual object data that a human gaze is detected as being positioned to enable the front surface of the glasses device to be viewable includes to detect that the human gaze is incident upon the front surface of the glasses device.

In some aspects, the techniques described herein relate to a method, wherein the implementing the protection process includes presenting a warning notification on the glasses device indicating that the sensitive content is detected as being viewable by a person other than a user of the glasses device, the warning notification including one or more suggested actions for preventing the sensitive content from being viewable by the person other than the user of the glasses device.

In some aspects, the techniques described herein relate to a method, wherein the implementing the protection process includes visually obscuring the sensitive content.

In some aspects, the techniques described herein relate to a method, wherein the determining that sensitive content is to be displayed on the one or more display devices includes determining that an application that includes the sensitive content is presented on the one or more display devices, and wherein the implementing the protection process includes: presenting a warning notification indicating that the human gaze is detected as being positioned to enable the front surface of the glasses device to be viewable; and presenting a selectable control that is selectable to cause the application to be closed.

In some aspects, the techniques described herein relate to a method, wherein the front surface of the glasses device includes one or more outer lenses separate from the one or more display devices, the one or more outer lenses include at least one electrochromic layer, and wherein the implementing the protection process includes controlling the at least one electrochromic layer to modify one or more of a shading of the one or more outer lenses or a color of the one or more outer lenses.

In some aspects, the techniques described herein relate to a system including: one or more processors implemented at least partially in hardware; and one or more computer-readable storage media storing instructions that are executable by the one or more processors to: define a risk zone as a subarea of a field of view of one or more cameras of a glasses device, the field of view extending from a front surface of the glasses device; determine that sensitive content is to be displayed on one or more display devices of the glasses device; determine based on visual data captured by the one or more cameras that a human gaze is detected within the risk zone as being positioned to enable the front surface of the glasses device to be viewable; and implement a protection process to mitigate exposure of the sensitive content to the human gaze detected within the risk zone.

In some aspects, the techniques described herein relate to a system, wherein the instructions are further executable by the one or more processors to determine based on further visual data captured by the one or more cameras that a different human gaze is detected within the field of view and outside of the risk zone such that a protection process is not implemented.

In some aspects, the techniques described herein relate to a system, wherein to implement the protection process includes one or more of to: remove the sensitive content from display on the one or more display devices; visually obscure the sensitive content on the one or more display devices; or present a warning notification that includes one or more suggested actions for preventing the sensitive content from being viewable by the human gaze.

In some aspects, the techniques described herein relate to a system, wherein the front surface of the glasses device includes one or more outer lenses separate from the one or more display devices, the one or more outer lenses include at least one electrochromic layer, and wherein to implement the protection process includes to control the at least one electrochromic layer to modify one or more of a shading of the one or more outer lenses or a color of the one or more outer lenses.

The invention claimed is:
1. A glasses device comprising:
one or more display devices positioned to display content from an internal perspective of the glasses device;
one or more cameras positioned to capture visual data of an external perspective extending from a front surface of the glasses device; and
one or more modules implemented at least in part in hardware of the glasses device to:

determine that sensitive content is to be displayed as part of the content displayed on the one or more display devices;
receive visual object data extracted from the visual data captured by the one or more cameras, the visual object data describing one or more visual objects detected in proximity to the front surface of the glasses device;
determine based on the visual object data that the front surface of the glasses device is viewable by a human gaze of a secondary person other than a user of the glasses device; and
implement a protection process to mitigate exposure of the sensitive content to the human gaze.

2. The glasses device of claim 1, wherein the glasses device further comprises one or more outer lenses that represent at least a portion of the front surface and that are positioned adjacent and separately from the one or more display devices.

3. The glasses device of claim 2, wherein to determine that the front surface of the glasses device is viewable by the human gaze of the secondary person comprises to determine that the human gaze is incident upon the one or more outer lenses.

4. The glasses device of claim 1, wherein the one or more modules are further implemented to:
define a risk zone as a subarea of a field of view of the one or more cameras, the field of view extending from the front surface of the glasses device,
wherein to determine that the front surface of the glasses device is viewable by the human gaze of the secondary person comprises to determine that the human gaze is detected within the risk zone.

5. The glasses device of claim 1, wherein to implement the protection process comprises to present a warning notification on the glasses device indicating that the sensitive content is detected as being viewable by another person.

6. The glasses device of claim 1, wherein to determine that sensitive content is to be displayed on the one or more display devices comprises to determine that an application that includes the sensitive content is presented on the one or more display devices, and wherein the one or more modules are further implemented to:
implement the protection process including to present a warning notification on the glasses device indicating that the sensitive content is detected as being viewable by a person other than the user of the glasses device; and
present as part of the warning notification a selectable control that is selectable to cause the sensitive content to be removed from display on the one or more display devices.

7. The glasses device of claim 6, wherein to cause the sensitive content to be removed from display comprises to cause the application to be closed.

8. The glasses device of claim 6, wherein to cause the sensitive content to be removed from display comprises to cause the sensitive content to be visually obscured.

9. The glasses device of claim 1, wherein the glasses device further comprises one or more outer lenses that represent at least a portion of the front surface and that are positioned adjacent and separately from the one or more display devices, the one or more outer lenses including at least one electrochromic layer, and wherein to implement the protection process includes to control the at least one electrochromic layer to modify one or more of a shading of the one or more outer lenses or a color of the one or more outer lenses.

10. A method, comprising:
determining that sensitive content is to be displayed on one or more display devices of a glasses device;
receiving visual object data extracted from visual data captured by one or more cameras of the glasses device, the visual object data describing one or more visual objects detected in proximity to a front surface of the glasses device;
determining based on the visual object data that the front surface of the glasses device is viewable by a human gaze of a secondary person other than a user of the glasses device; and
implementing a protection process to mitigate exposure of the sensitive content to the human gaze.

11. The method of claim 10, wherein said determining that sensitive content is to be displayed on the one or more display devices comprises receiving a notification that indicates one or more of that a process that includes sensitive content is being launched or that the sensitive content is currently being displayed on the one or more display devices.

12. The method of claim 10, wherein said determining based on the visual object data that the front surface of the glasses device is viewable by the human gaze of the secondary person comprises to detect that the human gaze is incident upon the front surface of the glasses device.

13. The method of claim 10, wherein said implementing the protection process comprises presenting a warning notification on the glasses device indicating that the sensitive content is detected as being viewable by a person other than the user of the glasses device, the warning notification including one or more suggested actions for preventing the sensitive content from being viewable by the person other than the user of the glasses device.

14. The method of claim 10, wherein said implementing the protection process comprises visually obscuring the sensitive content.

15. The method of claim 10, wherein said determining that sensitive content is to be displayed on the one or more display devices comprises determining that an application that includes the sensitive content is presented on the one or more display devices, and wherein said implementing the protection process comprises:
presenting a warning notification indicating that the human gaze is detected as being positioned to enable the front surface of the glasses device to be viewable; and
presenting a selectable control that is selectable to cause the application to be closed.

16. The method of claim 10, wherein the front surface of the glasses device includes one or more outer lenses separate from the one or more display devices, the one or more outer lenses include at least one electrochromic layer, and wherein said implementing the protection process comprises controlling the at least one electrochromic layer to modify one or more of a shading of the one or more outer lenses or a color of the one or more outer lenses.

17. A system comprising:
one or more processors implemented at least partially in hardware; and
one or more computer-readable storage media storing instructions that are executable by the one or more processors to:

define a risk zone as a subarea of a field of view of one or more cameras of a glasses device, the field of view extending from a front surface of the glasses device;

determine that sensitive content is to be displayed on one or more display devices of the glasses device;

determine based on visual data captured by the one or more cameras that the front surface of the glasses device is viewable by a human gaze of a secondary person other than a user of the glasses device; and implement a protection process to mitigate exposure of the sensitive content to the human gaze detected within the risk zone.

18. The system of claim 17, wherein the instructions are further executable by the one or more processors to determine based on further visual data captured by the one or more cameras that a different human gaze is detected within the field of view and outside of the risk zone such that the protection process is not implemented.

19. The system of claim 17, wherein to implement the protection process comprises one or more of to:

remove the sensitive content from display on the one or more display devices;

visually obscure the sensitive content on the one or more display devices; or present a warning notification that includes one or more suggested actions for preventing the sensitive content from being viewable by the human gaze.

20. The system of claim 17, wherein the front surface of the glasses device includes one or more outer lenses separate from the one or more display devices, the one or more outer lenses include at least one electrochromic layer, and wherein to implement the protection process comprises to control the at least one electrochromic layer to modify one or more of a shading of the one or more outer lenses or a color of the one or more outer lenses.

* * * * *